US007924864B2

United States Patent
Le et al.

(10) Patent No.: US 7,924,864 B2
(45) Date of Patent: Apr. 12, 2011

(54) TERMINAL-BASED CONTENTION FREE LOW OVERHEAD ACCESS

(75) Inventors: Khiem Le, Coppell, TX (US); Naveen Kumar Kakani, Irving, TX (US); Srinivas Sreemanthula, Flower Mound, TX (US)

(73) Assignee: Nokia Corporation, Espoo (FI)

( * ) Notice: Subject to any disclaimer, the term of this patent is extended or adjusted under 35 U.S.C. 154(b) by 835 days.

(21) Appl. No.: 11/492,910

(22) Filed: Jul. 26, 2006

(65) Prior Publication Data
US 2008/0025339 A1  Jan. 31, 2008

(51) Int. Cl.
H04L 12/28 (2006.01)
(52) U.S. Cl. ........ 370/431; 370/445; 370/331; 370/338; 370/328
(58) Field of Classification Search .......... 370/431, 370/445, 331–334, 338, 328, 229, 230; 398/43, 398/98, 99; 455/432.1, 432.3, 433, 435.1–435.3, 455/436–444
See application file for complete search history.

(56) References Cited

U.S. PATENT DOCUMENTS

| 7,058,719 B2* | 6/2006 | Motoyama | 709/228 |
| 2005/0025131 A1* | 2/2005 | Ko et al. | 370/352 |
| 2005/0025176 A1 | 2/2005 | Ko et al. | |
| 2005/0037798 A1* | 2/2005 | Yamashita et al. | 455/525 |
| 2005/0249142 A1* | 11/2005 | Kim et al. | 370/312 |
| 2006/0262767 A1* | 11/2006 | Peleg et al. | 370/338 |
| 2007/0214283 A1* | 9/2007 | Metke et al. | 709/245 |
| 2008/0318582 A1* | 12/2008 | Moon et al. | 455/446 |

FOREIGN PATENT DOCUMENTS
EP 0 643 521 A2 3/1995

OTHER PUBLICATIONS

Flikkema, Paul et al., "*Clique-Based Randomized Multiple Access for Energy-Efficient Wireless Ad Hoc Networks*", IEEE 2003, Mar. 2003, pp. 977-981.
Bianchi, G. et al., "*Analysis of Priority Mechanisms Based on Differentiated Inter Frame Spacing in CSMA-CA*", IEEE, Oct. 2003, pp. 1401-1405.
Mishra, Mayank et al., "*A Contention Window based Differentiation Mechanism for Providing QoS in Wireless LANs*", IEEE, Dec. 2006, pp. 1-5.
International Search Report PCT/IB2007/001305 filed May 21, 2007.

* cited by examiner

*Primary Examiner* — Kwang B Yao
*Assistant Examiner* — Nguyen Ngo
(74) *Attorney, Agent, or Firm* — Alston & Bird LLP (57) ABSTRACT

A station of a wireless local area network, the station includes a joining unit configured to join one of a plurality of cliques or to create a new clique, wherein each of the plurality of cliques includes at least one station and wherein each station in a clique can hear all other stations within the clique. The station also includes a communication unit configured to communicate with a server that assigns a unique value to each station in the clique when the station joins the network, wherein the value is used to determine a rank associated with each station within the clique. The server is configured to maintain a system map that defines information associated with each of the plurality of cliques and all of the stations in the network. The station also includes a listening unit configured to listen for a predefined signal such that upon receipt of the predefined signal each station in the clique is configured to begin transmission based on an order determined by a ranking of the stations in the clique.

37 Claims, 5 Drawing Sheets

TERMINAL-BASED CONTENTION FREE LOW OVERHEAD ACCESS

BACKGROUND OF THE INVENTION

1. Field of the Invention

The present invention relates to support of delay-sensitive services in a wireless local area network (WLAN), and more particularly, to a method of providing real time service, such as voice over Internet Protocol services, over a WLAN while taking into account such things as WLAN station throughput, power consumption and quality of service.

2. Description of the Related Art

A wireless local area network (WLAN) is one in which a mobile user can connect to a local area network (LAN) through a wireless/radio connection. Standards, such as IEEE 802.11, have been developed to specify the technologies for WLANs which are already commonly used in enterprise environments. However, WLAN is presently used for primarily non-real time data exchanges, such as email, web browsing, and file transfers. Because WLAN was not originally intended to support real time services, there are a number of issues and problems with using it for real-time applications, such as voice over Internet Protocol (VoIP). Specifically, when using WLAN for VoIP, there is a trade-off between terminal power consumption, overall system throughput, user throughput and quality of service requirements.

802.11 standards ensure that all stations, both radio-based network interface cards and access points, implement access methods for sharing the air medium. The basic 802.11 standard therefore mandates that all stations implement a Distributed Coordinated Function (DCF), that is, a form of carrier sense multiple access with collision avoidance (CSMA/CA). CSMA is a contention-based protocol for ensuring that all stations first "sense" the medium before transmitting data. The main goal of using DCF is to avoid having multiple stations transmit data at the same time, which results in collisions and corresponding retransmissions. Hence, DCF for the basic 802.11 standard is a contention-based protocol that does not support quality of service requirements. Because there is no way to guarantee that a station will be able to send its data within a certain time interval, in the DCF mode of operation, VoIP data can be subjected to intolerable days. Additionally, a basic WLAN in DCF modes is found to be quite inefficient when attempting to carry VoIP traffic such that various requirements of VoIP, for example, voice quality and delay, are met. For example, a single 11 Mbs WLAN access point may only serve on order of 10 voice calls, even though the traffic generated by these calls may be much less than 11 Mbs. Thus, the useful capacity of a basic WLAN in DCF modes is, in effect, much lower than one would expect.

To address quality of service issues, the 802.11 standards have evolved and the 802.11e specification provides a new mechanism, Enhanced Distributed Channel Access (EDCA), for resolving contention and supporting quality of service requirements. EDCA improves on the quality of service issues associated with DCF by employing different access traffic classes and access categories, such that it is possible to classify stations as having different transmission priorities. Thus, EDCA dramatically improves the chances that real time application data will be sent on a timelier basis. However, EDCA is still purely contention based, and even with the access categories, it is still possible that requested quality of service levels required for real time applications may not be met.

802.11 specifications do provide for "polled" modes of operation. In the "polled" modes of operation, it is possible for a point coordination function to employ contention free periods in which stations do not contend for transmission, but are instead individually polled to ensure transmission opportunities within a given time period. However, the start time when a station is allowed to transmit can vary. This variability means that the time it takes for all the polled stations to send data can vary greatly, depending on the traffic. This variation also may also mean that real time data, such as voice samples, may not meet real time requirements. In the 802.11e specification, an enhanced polling mechanism, Hybrid Controlled Channel Access (HCCA), may be used. Although HCCA is similar to the "polled" mechanism in basic 802.11 standards that uses point coordination function, it provides additional flexibility in terms of when a station can be polled and how long the station is allowed to transmit data. However, it may be quite difficult to determine when a station can be polled and how long the station is allowed to transmit data because a hybrid controller, which is responsible for polling the stations, has to be aware of information, such as latency, bandwidth and jitter, in order to prioritize how it polls the stations. The hybrid controller resides in the access point and without further knowledge of a station's status, the hybrid controller cannot know for sure that a station even has data to send. In addition, there is a signalling cost associated with polling which causes important overhead when the user data is small, as in the case of voice data, or when the data is nonexistent, as in the case of a silence interval during transmission of voice data.

Currently used request-to-send (RTS) and clear-to-send (CTS) mechanisms allow a station to request that exclusive use of the bandwidth be granted by the access point for a time period. The drawback of these mechanisms, however, is also signalling overhead.

Furthermore, there is a current problem of "hidden" terminal when using the contention based modes of operations. For example, station A might not be able to "hear" transmissions by a "hidden" station B, and hence there can be collisions due to the assumption that the medium is free when station A tries to send data on the medium at the same time as station B. As such, hidden terminals have a negative effect on overall system throughput. The current mechanisms discussed above solve the hidden terminal problem, but the solutions to the hidden terminal problem provided by these mechanisms also generate additional system overhead.

SUMMARY OF THE INVENTION

An embodiment of the present invention discloses a station of a wireless local area network, the station includes a joining unit for joining one of a plurality of cliques or creating a new clique. Each of the plurality of cliques includes at least one station and each station in a clique can hear all other stations within the clique. The station also includes a communication unit for communicating with a server that assigns a unique value to each station in the clique, when the station joins the network. The value is used to determine a rank associated with each station within the clique. The server maintains a system map that specifies information associated with each of the plurality of cliques and all of the stations in the network. The station also includes a listening unit configured to listen for a predefined signal such that upon receipt of the predefined signal each station in the clique is configured to begin transmission based on an order determined by a ranking of the stations in the clique.

Another embodiment of the present invention is directed to an apparatus for providing real time services on a station over a wireless local area network. The apparatus includes enabling means for enabling a station entering the network to join one of a plurality of cliques or create a new clique. Each of the plurality of cliques includes at least one station and each station in a clique can hear all other stations within the clique. The apparatus also includes assigning means for assigning a unique value to each station in the clique when the station joins the network, wherein the value is used to determine a rank associated with each station within the clique. The apparatus further includes maintaining means for maintaining a system map that defines information associated with each of the plurality of cliques and all of the stations in the network. The apparatus also includes listening means configured to listen for a predefined signal such that upon receipt of the predefined signal each station in the clique is configured to begin transmission based on an order determined by a ranking of the stations in the clique.

Yet another embodiment of the present invention is directed to a server of a wireless local area network. The server includes a communication unit for communicating with a station when the station joins one of a plurality of cliques or creates a new clique, wherein each of the plurality of cliques includes at least one station and wherein each station in a clique can hear all other stations within the clique. The server also includes an assigning unit for assigning a unique value to each station in the clique when the station joins the network, wherein the value is used to determine a rank associated with each station within the clique. The server further includes a maintenance unit for maintaining a system map that defines information associated with each of the plurality of cliques and all of the stations in the network. Each station in a clique is configured to listen for a predefined signal such that upon receipt of the predefined signal each station in the clique is configured to begin transmission based on an order determined by a ranking of the stations in the clique.

Another embodiment of the invention is directed to a method in a server for providing real time services to a station over a wireless local area network. The method includes communicating with a station when the station joins one of a plurality of cliques or creates a new clique, wherein each of the plurality of cliques comprises at least one station and wherein each station in a clique can hear all other stations within the clique. The method also includes assigning a unique value to each station in the clique when the station joins the network, wherein the value is used to determine a rank associated with each station within the clique and maintaining a system map that defines information associated with each of the plurality of cliques and all of the stations in the network. Each station in the clique is configured to listen for a predefined signal such that upon receipt of the predefined signal each station in the clique is configured to begin transmission based on an order determined by a ranking of the stations in the clique.

Another embodiment of the invention is directed to a method for providing real time services on a station over a wireless local area network. The method includes enabling a station entering the network to join one of a plurality of cliques or create a new clique. Each of the plurality of cliques includes at least one station and each station in a clique can hear all other stations within the clique. The method also includes assigning a unique value to each station in the clique when the station joins the network, wherein the value is used to determine a rank associated with each station within the clique and maintaining a system map that defines information associated with each of the plurality of cliques and all of the stations in the network. The method also includes listening for a predefined signal such that upon receipt of the predefined signal each station in the clique is configured to begin transmission based on an order determined by a ranking of the stations in the clique.

BRIEF DESCRIPTION OF THE DRAWINGS

The accompanying drawings, which are included to provide a further understanding of the invention and are incorporated in and constitute a part of this specification, illustrate embodiments of the invention that together with the description serve to explain the principles of the invention, wherein.

DETAILED DESCRIPTION OF PREFERRED EMBODIMENTS

Reference will now be made to preferred embodiments of the present invention, examples of which are illustrated in the accompanying drawings. The present invention is based on statistical multiplexing to exploit silence intervals found in VoIP data. Although statistical multiplexing approaches are well known, they may be subject to drawbacks, such as no guaranteed quality of service provision. Hence, an embodiment of the present invention provides a novel method that provides for the bandwidth efficiency of statistical multiplexing, preservation of quality of service and low signalling overhead.

Figure 1:
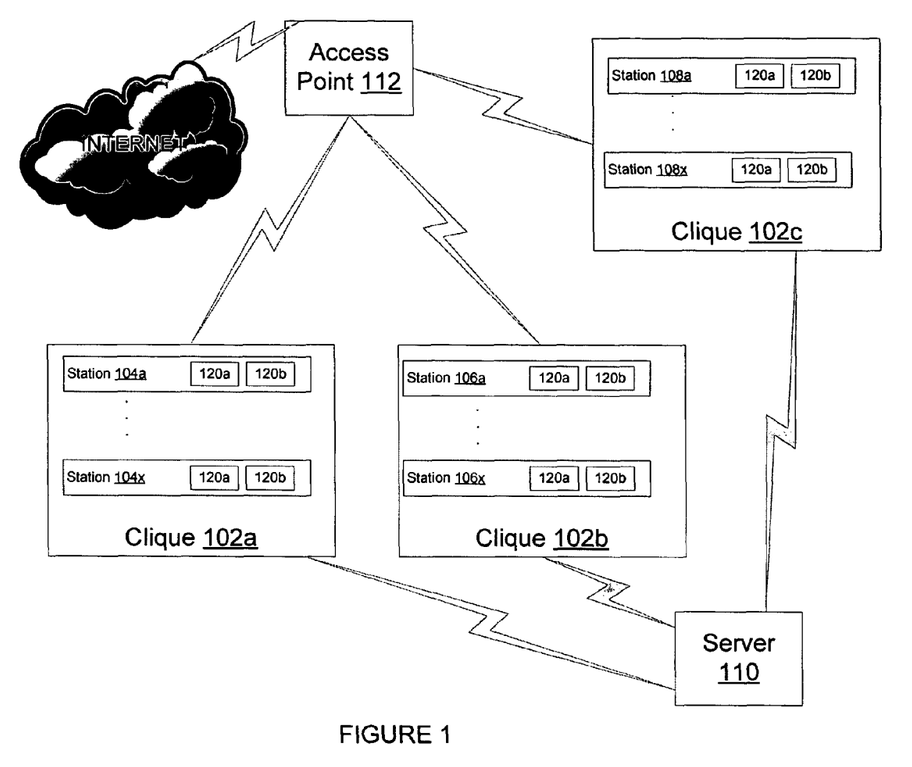
FIG. 1 illustrates an embodiment of a wireless local area network for implementing a system for providing real-time services over a WLAN while taking into account WLAN station throughput, user throughput, power consumption and quality of service requirements.

FIG. 1 illustrates an embodiment of wireless local area network (WLAN) for implementing a system for providing real-time services over a WLAN while taking into account WLAN station throughput, user throughput, power consumption and quality of service requirements. WLAN 100 includes cliques 102a-102c, stations 104a-104x, 106a-106x and 108a-108x, a system map information (SMI) server 110, a wireless LAN access point 112 and router 114 for connecting WLAN to the Internet 116. In an embodiment of the present invention, stations 104-108 are grouped into cliques 102a-102c such that all stations 104-108 within each clique 102a-102c can "hear" all other stations within the clique, that is, there are no hidden terminals within cliques 102. As illustrated in FIG. 1, each station 104-108 includes multiple components 102a and 102b for communicating with server 110 and for receiving information from server 110. Intra-clique contention is solved by assigning an inter-frame spacing value to each station in the clique so that no two stations in a clique have the same inter-frame spacing value. The inter-frame spacing value associated with each station determines the station's ranks in a clique, i.e., the order in which the stations can attempt to transmit data.

Inter-clique contention is solved by assigning non-overlapping time windows to each clique 102. A clique's window duration is dynamically adjusted based on the transmission needs of the stations in that clique. In an embodiment of the present invention, required signalling is kept to a minimum and all signalling takes place among the stations and possibly server 110. Thus, no modification to access point 112 is required.

An embodiment of the invention provides a system map information that defines the information specifying which stations 104-108 belongs to a specific clique 102, along with the stations inter-frame spacing values, and the ordering of cliques 102. In the station map information, the station with the lowest inter-frame spacing value is referred to as "first" station of the clique. Conversely, the station with the highest inter-frame spacing value is referred to as "last" station of the clique.

A cycle in the system map information denotes the sequence of clique windows, wherein the cycle for: clique 102a, clique 102b, ..., clique N denotes that window for clique 102a is first, the window for clique 102b is next and so on. The inter-frame spacing values are aligned to the start of the clique window. Furthermore, if the data has a periodicity requirement of X msec, where for example if X is equal to 20 msec for VoIP, then there is at least one cycle every X msec. A request-to-Send (RTS) signal from station Y, denoted by RTS (Y), shows that a request-to-send signal is transmitted to station Y. A clear-to-send (CTS) signal to station Y, denoted by CTS(Y), shows that a clear-to-send signal is addressed to station Y.

When a station, for example station 104a, joins the system or when it is going to start data transmission, station 104a obtains the system map information by querying a predefined address. The query is processed by SMI server 110, which returns the system map information. If there are existing cliques 102 in the system map information, station 104a determines if it can join clique 102a by listening to the request-to-send/clear-to-send signalling of all stations in each existing cliques. In an embodiment, if station 104a can hear the RTS(Y) and CTS (Y) of all the stations 104b-104x in clique 102a, station 104a will join clique 102a. If there are multiple "qualified" cliques, that is a clique where station 104a can hear the request-to-send/clear-to-send signalling of all stations in the clique, station 104a chooses of one of the qualified cliques. When station 104a joins, for example, clique 102a, station 104a contacts SMI server 110 to obtain an inter-frame spacing value. SMI server 110 assigns an inter-frame value that does not coincide with any of the existing inter-frame spacing values. SMI server 110 assigns the lowest available/unassigned inter-frame spacing value. It should be noted that depending on how inter-frame spacing values are managed, station 104a may or may not be the new "Last" station of clique 102a. SMI server 110 then distributes an updated system map information, including station 104a and its inter-frame spacing value, to all the stations 104-108.

Continuing with our example of station 104a, if there are no such existing qualified cliques where station 104a can hear the request-to-send/clear-to-send signalling of all stations in the clique, station 104a creates a new clique. To create a new clique, station 104a contacts SMI server 110 to obtain an inter-frame spacing value. Similar to when station 104a joins an existing clique, SMI server 110 assigns an inter-frame value that does not coincide with any of the existing inter-frame spacing values. Specifically, SMI server 110 assigns the lowest possible inter-frame spacing value among the ones that are currently unassigned and SMI server 110 distributes the updated system map information, including station 104a, to all existing stations.

Cliques 102 may need to be updated, if hidden terminal conditions change in the cliques over time, for example, due to mobility. If station 106a hears a CTS(106b), but did not hear RTS(106b) for station 106b in the same clique 102b, station 106a may decide to reinitiate its clique determination procedure by listening for the RTS(106) and CTS(106) of all stations in clique 102b. If station 106a cannot hear the RTS (106) and CTS(106) of all stations in clique 102b, station 106a may decide to leave the system.

When a station leaves the system or when it stops data transmission, it notifies SMI server 110, which updates the system map information and distributes the updated system map information to all stations 104-108. The inter-frame spacing value assigned to the leaving station, for example 106a, is returned to a pool of unassigned inter-frame spacing values. If the leaving station was "first" station in the clique, the next ranked station becomes the new "first" station. If the leaving station was "Last" station in the clique, the preceding ranked station becomes the new "last" station.

A station that has data to transmit will listen for clear-to-send signal of the "first" station of the clique to which the sending station belongs and start its inter-frame spacing timer at receipt of that clear-to-send signal. A station that is first station of its clique and that has data to transmit will listen for clear-to-send signal of the "last" station of the preceding clique. When that clear-to-send signal of the "last" station of the preceding clique is heard, the first transmitting station in the next clique issues a request-to-send signal. In an embodiment of the invention, the first station of the first clique will listen for the clear-to-send signal of the "last" station in the last clique. In one embodiment of the invention, the first station sends the request-to-send signal right away. In another embodiment of the invention, the first station sends the request-to-send signal after a predetermined amount of time to provide time for other traffic.

At its normally scheduled time, as determined by its inter-frame spacing value, a station that is the last station of its clique transmits its data and issues a request-to-send signal. If the station that is the last station of its clique does not have data, it issues only a request-to-send signal.

If a clique is a single member clique, meaning that there is only one station in the clique, then to avoid confusion for the cliques that follow the single member clique on how to interpret the clear-to-send signals addressed to the station in the single member clique, stations of the clique following the single member clique start transmission of a request-to-send signal only after hearing two clear-to-send signals addressed to the station of the single member clique. To address the scenario where the station in the signal member clique has failed, without updating the SMI map, the stations in the clique following the single member clique start a timer after the last clear-to-send signal that is send on the medium. After expiration of the timer, if there is no activity on the medium, the stations in the clique following the single member clique may start transmission of a request-to-send signal.

As noted above, a new station listens for request-to-send signals and "clear-to-send signals" of all stations in each clique to determine which cliques are "qualified" cliques. Thus, request-to-send and clear-to-send signals must be issued from other stations, which are not "first" or "last" stations of a clique, to allow a new station to determine whether nor not to join a clique, and also to enable cliques updates. Various approaches may be implemented for enabling the other stations to listen for request-to-send signals and clear-to-send signals. For example, each station may issue a request-to-send signal every N cycles for cycle i, i+N, i+2N, etc. where i is chosen randomly by the station. In another example, a station may issue a request-to-send signal upon request from server 110. Server 110 runs its algorithm for issuing the request.

In the basic form described above, failure of a "Last" or "First" station will have a system wide impact. To address the single failure point issue, if a failure occurs at the "First" station, such that no clear-to-send signal is heard for the first station, the next ranked station in the clique takes over and issues a request-to-send signal. If failure is confirmed after m cycles, server 110 updates the system map information as if the failed station left the system. If, however, failure occurs at the "Last" station, such that no clear-to-send signal is heard for the last station, the First station of the next clique takes over and issues a request-to-send signal. If failure is confirmed after m cycles, server 110 updates the system map information as if the failed station left the system. Server 110 is assumed to be reliable enough and as such is implemented with the appropriate amount of redundancy. However, an additional fallback is for the stations 104-108 to operate without communicating with server 110, to overcome the case when stations 104-108 cannot reach server 110.

Figure 2:
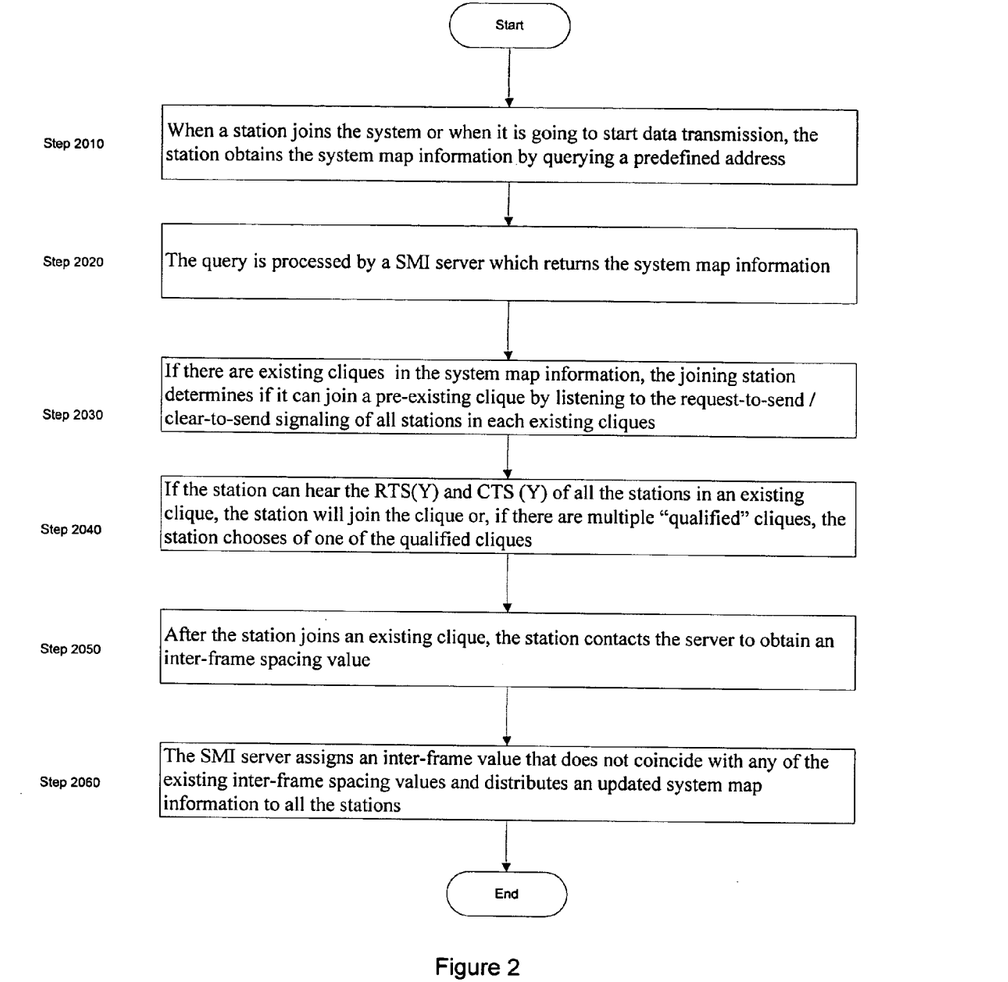
FIG. 2 illustrates the steps implemented in an embodiment of the present invention for a new station to join an existing clique.

FIG. 2 illustrates the steps implemented in an embodiment of the present invention for a new station to join an existing clique. In Step 2010, when a station joins the system or when it is going to start data transmission, the station obtains the system map information by querying a predefined address. In Step 2020, the query is processed by SMI server 110, which returns the system map information. In Step 2030, if there are existing cliques 102 in the system map information, the joining station determines if it can join a pre-existing clique 102 by listening to the request-to-send/clear-to-send signalling of all stations in each existing cliques. In Step 2040, if the station can hear the RTS(Y) and CTS (Y) of all the stations in an existing clique 102, the station will join clique 102. Alternatively, if there are multiple "qualified" cliques, the station chooses one of the qualified cliques. In Step 2050, after the station joins an existing clique, the station contacts SMI server 110 to obtain an inter-frame spacing value. In Step 2060, SMI server 110 assigns an inter-frame value that does not coincide with any of the existing inter-frame spacing values and distributes an updated system map information to all the stations.

Figure 3:
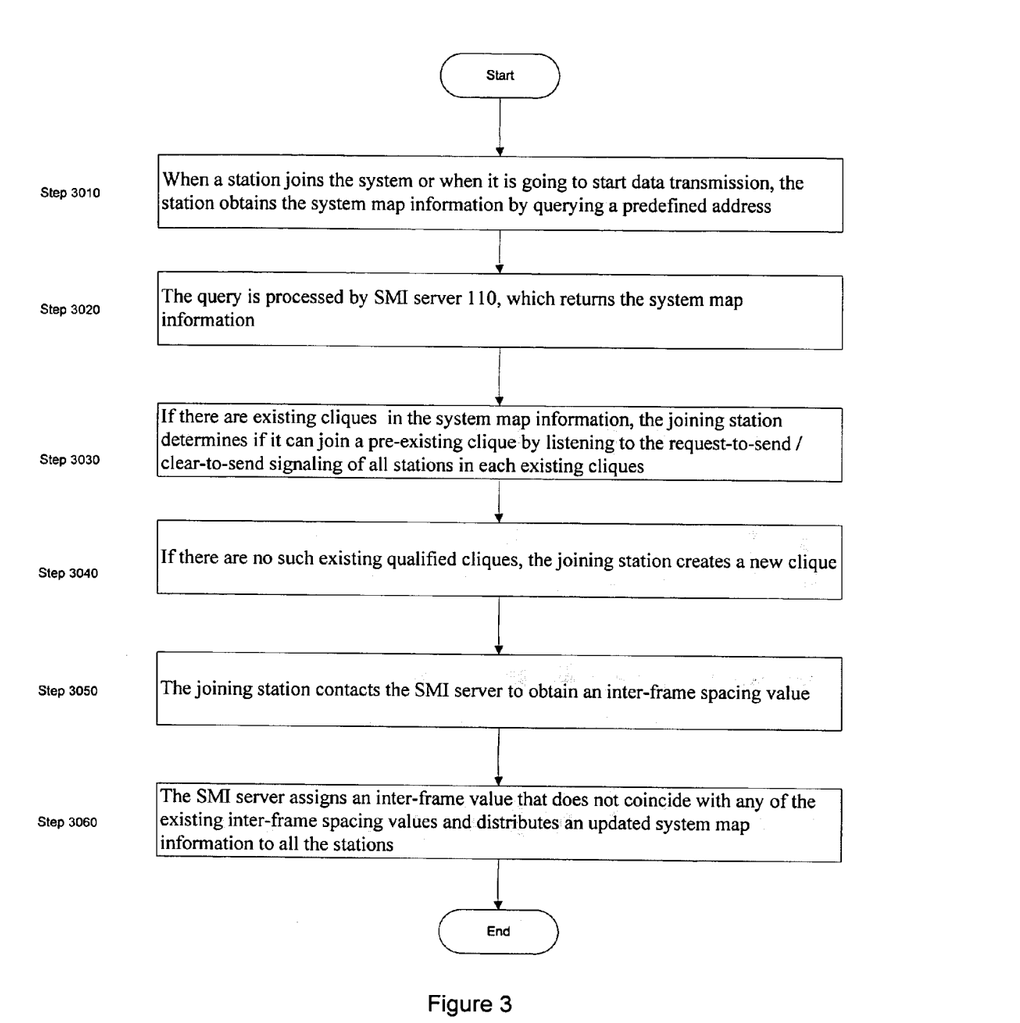
FIG. 3 illustrates the steps implemented in an embodiment of the present invention for a new station to create a new clique.

FIG. 3 illustrates the steps implemented in an embodiment of the present invention for a new station to create a new clique. In Step 3010, when a station joins the system or when it is going to start data transmission, the station obtains the system map information by querying a predefined address. In Step 3020, the query is processed by SMI server 110, which returns the system map information. In Step 3030, if there are existing cliques 102 in the system map information, the joining station determines if it can join a pre-existing clique 102 by listening to the request-to-send/clear-to-send signalling of all stations in each existing cliques. In Step 3040, if there are no such existing qualified cliques, the joining station creates a new clique. In Step 3050, the joining station contacts SMI server 110 to obtain an inter-frame spacing value. In Step 3060, SMI server 110 assigns an inter-frame value that does not coincide with any of the existing inter-frame spacing values and distributes the updated system map information to all existing stations.

Figure 4:
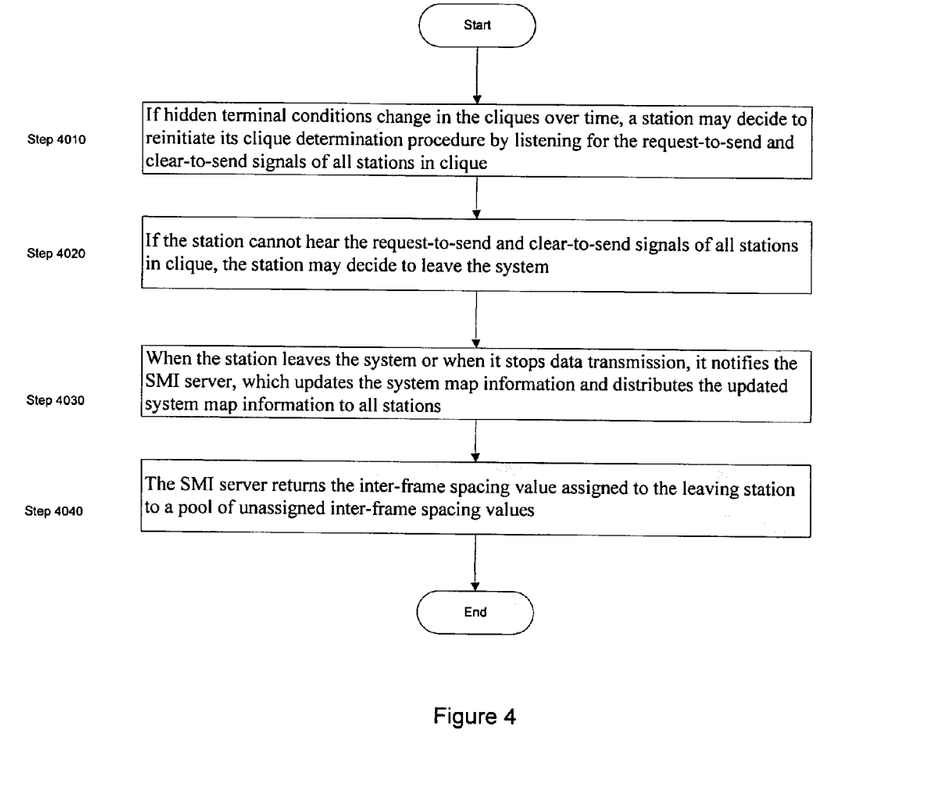
FIG. 4 illustrates the steps implemented in an embodiment of the present invention for updating an existing clique.

FIG. 4 illustrates the steps implemented in an embodiment of the present invention for updating an existing clique. In Step 4010, if hidden terminal conditions change in the cliques over time, a station may decide to reinitiate its clique determination procedure by listening for the request-to-send and clear-to-send signals of all stations in clique. In Step 4020, if the station cannot hear the request-to-send and clear-to-send signals of all stations in clique, the station may decide to leave the system. In Step 4030, when the station leaves the system or when it stops data transmission, it notifies SMI server 110, which updates the system map information and distributes the updated system map information to all stations 104-108. In Step 4040, SMI server 110 returns the inter-frame spacing value assigned to the leaving station to a pool of unassigned inter-frame spacing values. If the leaving station was "first" station in the clique, the next ranked station becomes the new "first" station. If the leaving station was "Last" station in the clique, the preceding ranked station becomes the new "last" station.

Figure 5:
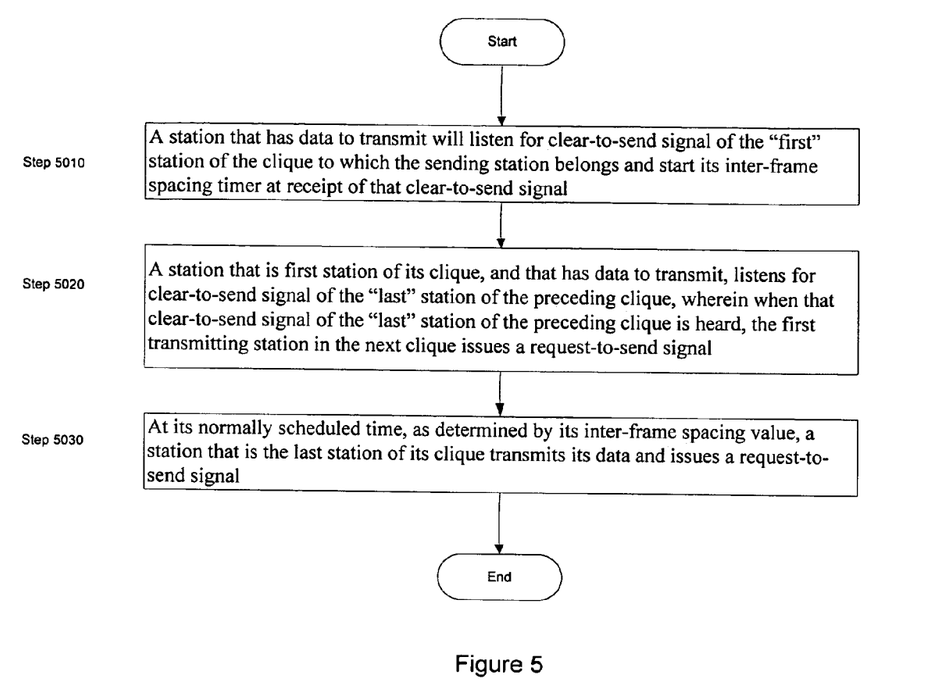
FIG. 5 illustrates the steps implemented in an embodiment of the present invention for an existing station to transmit data.

FIG. 5 illustrates the steps implemented in an embodiment of the present invention for an existing station to transmit data. In Step 5010, a station that has data to transmit will listen for clear-to-send signal of the "first" station of the clique to which the sending station belongs and start its inter-frame spacing timer at receipt of that clear-to-send signal. In Step 5020, a station that is first station of its clique, and that has data to transmit, will listen for clear-to-send signal of the "last" station of the preceding clique, wherein when that clear-to-send signal of the "last" station of the preceding clique is heard, the first transmitting station in the next clique issues a request-to-send signal. In Step 5030, at its normally scheduled time, as determined by its inter-frame spacing value, a station that is the last station of its clique transmits its data and issues a request-to-send signal. If the station that is the last station of its clique does not have data, it issues only a request-to-send signal.

The present invention has the advantages of both contention free and low overhead mechanisms. It eliminates contention and therefore the cost of collision and retransmission attempts, while providing guaranteed delay quality of service with virtually no signalling overhead. Therefore, the system can operate very close to its maximum capacity. The present invention also overcomes the hidden terminal problem and it does not require modifications to the access points. Furthermore, because contention is eliminated, this present invention is also very relevant for the WiFi mesh case. It is known that contention based access can result in serious throughput issues in mesh case. Although there can still be a hidden terminal problem if non-enhanced terminals coexist in the system, this problem may be addressed by assigning separate channels to non-enhanced terminals.

It should be appreciated by one skilled in art, that the present invention may be utilized in any device that implements the network availability information described above. The foregoing description has been directed to specific embodiments of this invention. It will be apparent; however, that other variations and modifications may be made to the described embodiments, with the attainment of some or all of their advantages. Therefore, it is the object of the appended claims to cover all such variations and modifications as come within the true spirit and scope of the invention.

What is claimed:

1. An apparatus comprising:
   a joining unit configured to cause a mobile station of a wireless network to join a selected clique, the selected clique being one of a plurality of existing cliques or a newly created clique, wherein the selected clique comprises at least the mobile station and wherein each mobile station in the selected clique is configured to hear all other stations within the selected clique;
   a communication unit configured to cause communication with a server and to receive a unique value within the selected clique that is assigned by the server to the mobile station when the mobile station joins the selected clique, the unique value being used to determine a rank associated with the mobile station within the selected clique, the communication unit being further configured to receive information in a system map that defines information associated with each of the plurality of cliques and all of the mobile stations in the network, and a listening unit configured to, upon receipt of a predefined signal, cause transmission to begin based on an order determined by the rank of the mobile station in the selected clique.

2. The apparatus of claim 1, wherein the joining unit is configured to obtain the system map when the mobile station joins the network or at the start of data transmission, wherein a query for the system map from the mobile station is processed by the server.

3. The apparatus of claim 1, wherein the communication unit is configured to receive an updated system map from the server when the information in the system map is updated by the server.

4. The apparatus of claim 1, wherein the joining unit is configured to determine, on a periodic basis, whether no not to reinitiate a clique determination procedure, wherein the mobile station may leave a clique if it cannot hear the signaling of all mobile stations within the clique.

5. The apparatus of claim 1, wherein the joining unit is configured to notify the server when the mobile station leaves the selected clique, such that the system map is updated and the updated system map is distributed to other mobile stations in the network, wherein the joining unit is further configured to return the unique value assigned to the mobile station to the server for placement in an unassigned pool of values.

6. The apparatus of claim 1, wherein the joining unit is configured to, upon joining the network, determine whether to cause the mobile station to join at least one of the plurality of existing cliques by listening to signaling of all mobile stations within each of the plurality of existing cliques, wherein the joining unit is configured to cause the mobile station to join the selected clique if the mobile station is capable of hearing all of the mobile stations within the selected clique.

7. The apparatus of claim 1, wherein the joining unit is configured to select one of the plurality of existing cliques, if the mobile station is capable of hearing all of the mobile stations within the plurality of existing cliques.

8. The apparatus of claim 1, wherein the joining unit is configured to determine, upon joining the network, whether to join at least one of the plurality of existing cliques by listening to signaling of all mobile stations within each of the plurality of existing cliques, wherein a new single mobile station clique is created and selected if the mobile station is not capable of hearing all of the mobile stations within one of the plurality of existing cliques.

9. The apparatus of claim 8, wherein if the selected clique is the newly created single mobile station clique, the listening unit is configured to cause transmission of a request-to-send signal only after hearing a predefined number of clear-to-send signals that were addressed to the mobile station in the selected clique.

10. The apparatus of claim 8, wherein if the selected clique is the newly created single mobile station clique, the listening unit is configured to start a timer after a last clear-to-send signal, wherein at the expiration of the timer, the mobile station is configured to cause transmission of a request-to-send signal if there is activity on a medium where the last clear-to-send signal was detected.

11. The apparatus of claim 1, wherein the communication unit is configured to obtain the system map that defines a specific clique to which each mobile station belongs, the unique value associated with each mobile station and an ordering of the plurality of existing cliques.

12. The apparatus of claim 1, wherein the communication unit is configured to obtain the system map such that if the mobile station is defined with a lowest unique value in the selected clique then the mobile station is defined as a first mobile station of the selected clique, and if the mobile station is defined with a highest unique value in the selected clique then the mobile station is defined as a last mobile station of the clique.

13. The apparatus of claim 1, wherein the communication unit is configured to access the system map wherein a cycle in the system map denotes the sequence of clique windows assigned to the plurality of existing cliques and clique values are aligned to the start of a clique window and wherein there is at least one cycle for every periodicity requirement.

14. The apparatus of claim 13, wherein the communication unit is configured to cause communication with the server for assigning non-overlapping clique windows to each of the plurality of existing cliques, wherein a window associated with one of the plurality of existing cliques is dynamically adjusted based on the transmission needs of the mobile stations in that clique.

15. A method, comprising:
enabling a mobile station of a wireless network to join a selected clique, the selected clique being one of a plurality of existing cliques or a newly created clique, wherein the selected clique comprises at least the mobile station and wherein each mobile station in the selected clique is configured to hear all other mobile stations within the selected clique;
receiving a unique value within the selected clique that is assigned to the mobile terminal when the mobile station joins the selected clique, wherein the unique value is used to determine a rank associated with the mobile station within the selected clique;
obtaining a system map that defines information associated with each of the plurality of existing cliques and all of the mobile stations in the network; and
upon receiving a predefined signal, causing transmission to begin based on an order determined by the rank of the mobile station in the selected clique.

16. The method of claim 15, wherein the joining comprises obtaining the system map when the mobile station joins the network or at the start of data transmission.

17. The method of claim 15, wherein the receiving further comprises receiving an updated system map, by the mobile station, from a server when the information in the system map is updated by the server.

18. The method of claim 15, further comprising, on a periodic basis, determining by the mobile station whether or not to reinitiate a clique determination procedure, wherein the mobile station determines whether to leave the selected clique if it cannot hear the signaling of all mobile station within the selected clique.

19. The method of claim 18, further comprising, upon leaving the selected clique, notifying a server by the mobile station, wherein the server updates the system map, returns the unique value assigned to the mobile station to an unassigned pool of values and distributes an updated system map to other mobile stations in the network.

20. The method of claim 15, further comprising, upon joining the network, determining by the mobile station whether to cause the mobile station to join at least one of the plurality of existing cliques by listening to signaling of all mobile stations within each of the plurality of existing cliques, wherein the mobile station is caused to join the selected clique if the mobile station is capable of hearing all of the mobile stations within the selected clique.

21. The method of claim 15, wherein the joining further comprises selecting, by the mobile station, one of the plurality of existing cliques, if the mobile station is capable of hearing all of the mobile stations within the plurality of existing cliques.

22. The method of claim 15, wherein the joining further comprises determining by the mobile station whether to cause the mobile station to join at least one of the plurality of existing cliques by listening to signaling of all mobile stations within each of the plurality of existing cliques, wherein if the mobile station is not capable of hearing all of the mobile stations within one of the plurality of existing cliques, the mobile station is caused to create a newly created single mobile station clique.

23. The method of claim 22, wherein if the selected clique is the newly created single mobile station clique, the method further comprises causing transmission to begin, by a mobile station, of a request-to-send signal only after hearing a predefined number of clear-to-send signals that were addressed to the mobile station in the selected clique.

24. The method of claim 22, wherein if the selected clique is the newly created single mobile station clique, the method further comprises beginning a timer, by a mobile station, after a last clear-to-send signal,
wherein at the expiration of the timer, the mobile station is caused to transmit a request-to-send signal if there is activity on a medium where the last clear-to-send signal was detected.

25. An apparatus, comprising:
a communication unit configured to cause communication with a mobile station when the mobile station joins one of a plurality of cliques or creates a new clique, each of the plurality of cliques comprising at least one mobile station and each mobile station in a clique being configured to hear all other mobile stations within the clique;
an assigning unit configured to assign a unique value to each mobile station in a clique when the mobile station joins the respective clique, the unique value being used to determine a rank associated with each mobile station within the clique; and
a maintenance unit configured to maintain a system map that defines information associated with each of the plurality of cliques and all of the mobile stations in the network, wherein each mobile station is configured to listen for a predefined signal such that upon receipt of the predefined signal each mobile station in the clique is configured to begin transmission based on an order determined by a ranking of the mobile stations in the clique.

26. The apparatus of claim 25, wherein the communication unit is configured to process a query for the system map from the mobile station when the mobile station joins the network.

27. The apparatus of claim 25, wherein the maintenance unit is configured to distribute an updated system map to the mobile station when the information in the system map is updated by a server.

28. The apparatus of claim 25, wherein the maintenance unit is configured to update the system map, return the value assigned to a mobile station leaving the network to an unassigned pool of values and distribute the updated system map to other mobile stations in the network.

29. The apparatus of claim 25, wherein the maintenance unit is configured to maintain the system map that defines a specific clique to which each mobile station belongs, the value associated with each mobile station and an ordering of the plurality of cliques.

30. The apparatus of claim 25, wherein the maintenance unit is configured to define the system map such that if the mobile station is defined with a lowest value in the clique then the mobile station is defined as a first mobile station of the clique and if the mobile station is defined with a highest value in the clique then the mobile station is defined as a last mobile station of the clique.

31. The apparatus of claim 25, wherein the maintenance unit is configured to define the system map such that a cycle in the system map denotes the sequence of the windows assigned to the plurality of cliques and the values of a clique are aligned to the start of a clique window and wherein there is at least one cycle for every periodicity requirement.

32. The apparatus of claim 25, wherein the maintenance unit is configured to define the system map such that non-overlapping time windows are assigned to each of the plurality of cliques, wherein a window associated with one of the plurality of cliques is dynamically adjusted based on the transmission needs of the mobile stations in that clique.

33. A method, comprising:
causing communication with a mobile station when the mobile station joins one of a plurality of cliques or creates a new clique, wherein each of the plurality of cliques comprises at least one mobile station and wherein each mobile station in a clique can hear all other mobile stations within the clique;
assigning a unique value to each mobile station in a clique when the mobile station joins the network, wherein the value is used to determine a rank associated with each mobile station within the clique; and
maintaining a system map that defines information associated with each of the plurality of cliques and all of the mobile stations in the network, wherein each mobile station in a clique is configured to listen for a predefined signal such that upon receipt of the predefined signal each mobile station in the clique is configured to begin transmission based on an order determined by a ranking of the mobile stations in the clique.

34. An apparatus comprising at least one processor and at least one memory including computer program code, the at least one memory and the computer program code configured to, with the at least one processor, cause the apparatus at least to perform:
enabling a mobile station entering the network to join one of a plurality of cliques or create a new clique, wherein each of the plurality of cliques comprises at least one mobile station and wherein each mobile station in a clique can hear all other mobile stations within the clique;
assigning a unique value to each mobile station in the clique when the mobile station joins the network, wherein the value is used to determine a rank associated with each mobile station within the clique, and wherein upon receipt of a predefined signal each mobile station in a clique is configured to begin transmission based on an order determined by a ranking of the mobile stations in the clique; and
maintaining a system map that defines information associated with each of the plurality of cliques and all of the mobile stations in the network, wherein each mobile terminal in a clique is configured to, upon receipt of the predefined signal, begin transmission based on an order determined by a ranking of the mobile stations in the clique.

35. A non-transitory computer program product embodied on a computer readable memory, upon execution a computer program stored on the computer readable memory an apparatus is caused to perform:

enabling a mobile station entering the network to join a selected clique, the selected clique being one of a plurality of existing cliques or a newly created clique, wherein the selected clique comprises at least the mobile station and wherein each mobile station in the selected clique is configured to hear all other mobile stations within the selected clique;

receiving a unique value within the selected clique when the mobile station joins the selected clique, wherein the unique value being used to determine a rank associated with the mobile station within the selected clique;

obtaining a system map that defines information associated with each of the plurality of existing cliques and all of the mobile stations in the network; and upon receipt of a predefined signal cause transmission to begin based on an order determined by the rank of the mobile station in the selected clique.

36. A non-transitory computer program product of claim 35, wherein execution of the computer program causes receiving the unique value, wherein the unique value is a unique inter-frame spacing value within the selected clique.

37. A non-transitory computer program product of claim 35, wherein execution of the computer program causes receiving the unique value, wherein the unique value is the earliest available unique inter-frame spacing value for communications within the selected clique.

* * * * *